(12) United States Patent
Ono et al.

(10) Patent No.: US 7,233,717 B2
(45) Date of Patent: Jun. 19, 2007

(54) REFLECTIVE OPTICAL SWITCH

(75) Inventors: Hiroaki Ono, Aichi (JP); Shohei Abe, Shizuoka (JP); Hideo Takeshita, Aichi (JP); Hiroki Tatara, Shizuoka (JP); Kazuhide Kubo, Shizuoka (JP)

(73) Assignee: FDK Corporation, Tokyo (JP)

( * ) Notice: Subject to any disclaimer, the term of this patent is extended or adjusted under 35 U.S.C. 154(b) by 31 days.

(21) Appl. No.: 10/938,366

(22) Filed: Sep. 10, 2004

(65) Prior Publication Data
US 2005/0058391 A1    Mar. 17, 2005

Related U.S. Application Data

(63) Continuation of application No. PCT/JP03/02795, filed on Mar. 10, 2003.

(30) Foreign Application Priority Data
Mar. 19, 2002 (JP) .............................. 2002-077052

(51) Int. Cl.
*G02B 6/12* (2006.01)
*G02B 6/38* (2006.01)
*G02B 6/00* (2006.01)
*G02B 26/02* (2006.01)

(52) U.S. Cl. .................... 385/19; 385/73; 385/140; 359/227

(58) Field of Classification Search .................... None
See application file for complete search history.

(56) References Cited

U.S. PATENT DOCUMENTS 5,471,340 A    11/1995    Cheng et al.
5,930,418 A *   7/1999    Chang ........................ 385/24

FOREIGN PATENT DOCUMENTS

| JP | 09-258136 | 10/1997 |
|---|---|---|
| JP | 2000-039590 | 2/2000 |
| JP | 2001-117060 | 4/2001 |

OTHER PUBLICATIONS

International Search Report for PCT/JP03/02795; ISA/JP; Mailed: Apr. 15, 2003.

* cited by examiner

*Primary Examiner*—Frank G. Font
*Assistant Examiner*—Erin D. Chiem
(74) *Attorney, Agent, or Firm*—Harness, Dickey & Pierce, PLC

(57) ABSTRACT

A reflective optical switch comprises an input/output port portion; a polarization separator/combiner for separating lights in the same optical path and combining lights in different optical paths; a Faraday rotation angle changer; a polarization rotator for changing the relationship in polarizing direction between lights in different optical paths; a birefringence element for optical path control for controlling optical path shift in response to polarizing direction; and a polarization rotating reflector for rotating polarizing direction 90 degrees on forward and return paths. The input/output port portion, the polarization separator/combiner, the Faraday rotation angle changer, the polarization rotator, the birefringence element for optical path control, and the polarization rotating reflector are arranged along the optical path, and the Faraday rotation angle changer includes a Faraday element and an electromagnet for controlling 90-degree change in polarizing direction of transmitted light thereof.

14 Claims, 8 Drawing Sheets

REFLECTIVE OPTICAL SWITCH

CROSS-REFERENCE TO RELATED APPLICATIONS

This application is a continuation application of the International Application No. PCT/JP03/02795 designating the United States of America, which is herein incorporated by reference.

BACKGROUND OF THE INVENTION

1. Field of the Invention

The present invention relates to a magneto-optical type optical switch for light on/off control and optical path change in the fields such as optical communications and measurement. More particularly, the invention relates to a reflective optical switch that ensures size reduction and higher performance through a reflective configuration in which there is provided an input/output port portion with a number of fibers at one end of an optical switch functional unit so as to allow for a light beam to couple with different fibers after a round trip through the optical switch functional unit.

2. Description of the Related Art

Optical switches are optical devices having the optical path switching capability—typically to output input light from the input port to an arbitrary output port selected from among different output ports. The most basic form is 1×2 type (one input with two outputs), with various other systems and configurations developed today.

It is essential that an optical switch for optical communications be polarization independent, and among those meeting this requirement is a configuration in which a plurality of optical components such as birefringence elements, wave plates or Faraday rotators are arranged for use as an optical switch functional unit, with an input port portion provided at one end portion of the optical switch functional unit and an output port portion provided at the other end portion. The optical switch functional unit controls an external magnetic field applied by mechanically moving a permanent magnet or by an electromagnetic method, thus changing the polarizing direction and achieving optical path switching.

However, conventional optical switches have input and output port portions arranged opposed to each other at both end portions of the optical switch functional unit, making it necessary to use a number of optical components and arrange the components in a line. This has led to not only a high price but also a large size (long size).

In the case of a configuration that switches movable portions by a mechanical drive portion, on the other hand, there is a possibility that characteristic deterioration may occur as a result of chipping or wear, and furthermore the switching speed is slow.

BRIEF SUMMARY OF THE INVENTION

It is an object of the present invention to provide a magneto-optical type optical switch that is capable of high-speed operation and is highly reliable owing to absence of mechanical mobile portions and that can be downsized through reduced component count.

An aspect of the present invention provides a reflective optical switch comprising an input/output port portion having a plurality of fibers; a polarization separator/combiner for separating lights in the same optical path whose polarizing directions are orthogonal to each other and combining lights in different optical paths; a Faraday rotation angle changer; a polarization rotator for changing the relationship in polarizing direction between lights in different optical paths from orthogonal to parallel or from parallel to orthogonal; a birefringence element for optical path control for controlling optical path shift in response to polarizing direction; and a polarization rotating reflector for rotating polarizing direction 90 degrees on forward and return paths, wherein the input/output port portion, the polarization separator/combiner, the Faraday rotation angle changer, the polarization rotator, the birefringence element for optical path control, and the polarization rotating reflector are arranged along the optical path, and wherein the Faraday rotation angle changer includes a Faraday element and an electromagnet for controlling 90-degree change in polarizing direction of transmitted light thereof.

DETAILED DESCRIPTION OF THE INVENTION

Figure 1A:
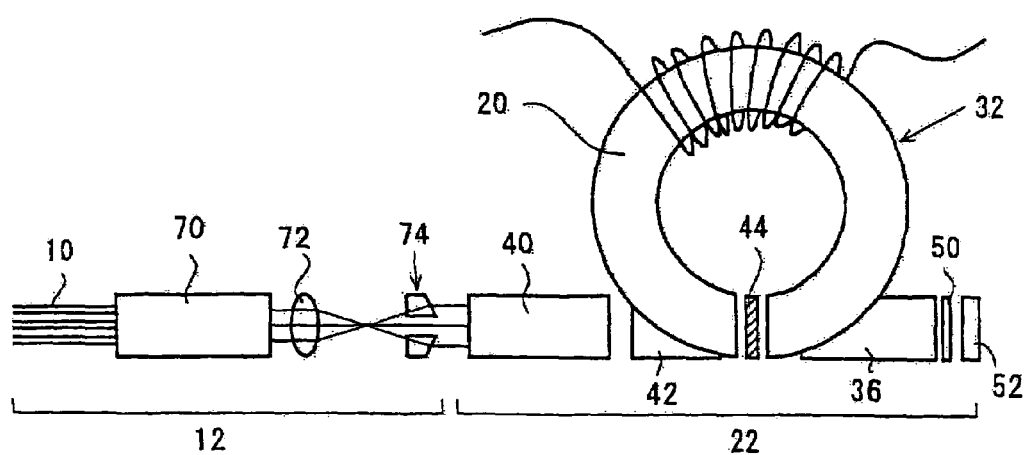
FIGS. 1A and 1B are explanatory views showing one embodiment of a reflective optical switch according to the present invention.
Figure 1B:
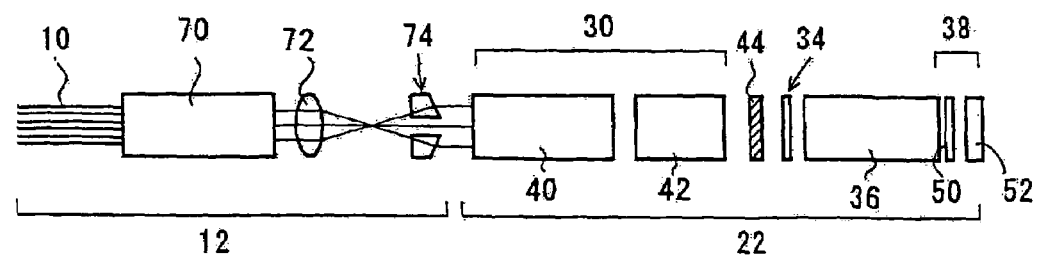

FIGS. 1A and 1B are schematic explanatory views of an embodiment of a reflective optical switch according to the present invention. FIG. 1A represents an overall configuration, whereas FIG. 1B represents arrangement of optical components excluding an electromagnet. This reflective optical switch has an input/output port portion 12 with a plurality of fibers 10 and a magneto-optical type reflective optical switch functional unit 22 provided with an electromagnet 20.

Figure 2:
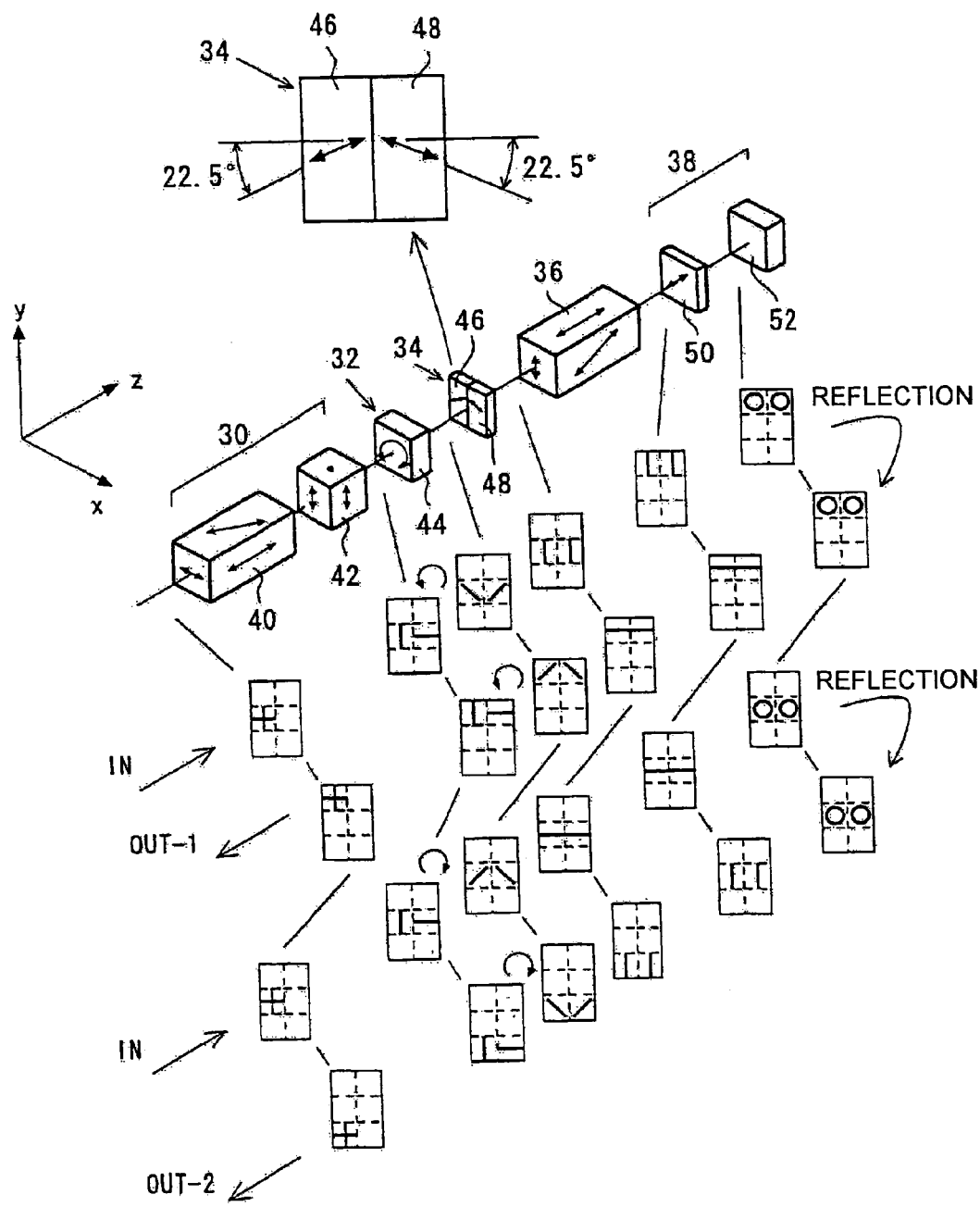
FIG. 2 is an explanatory view showing arrangement of optical components in a functional unit of the reflective optical switch and a polarizing direction at each position.
Figure 3A:
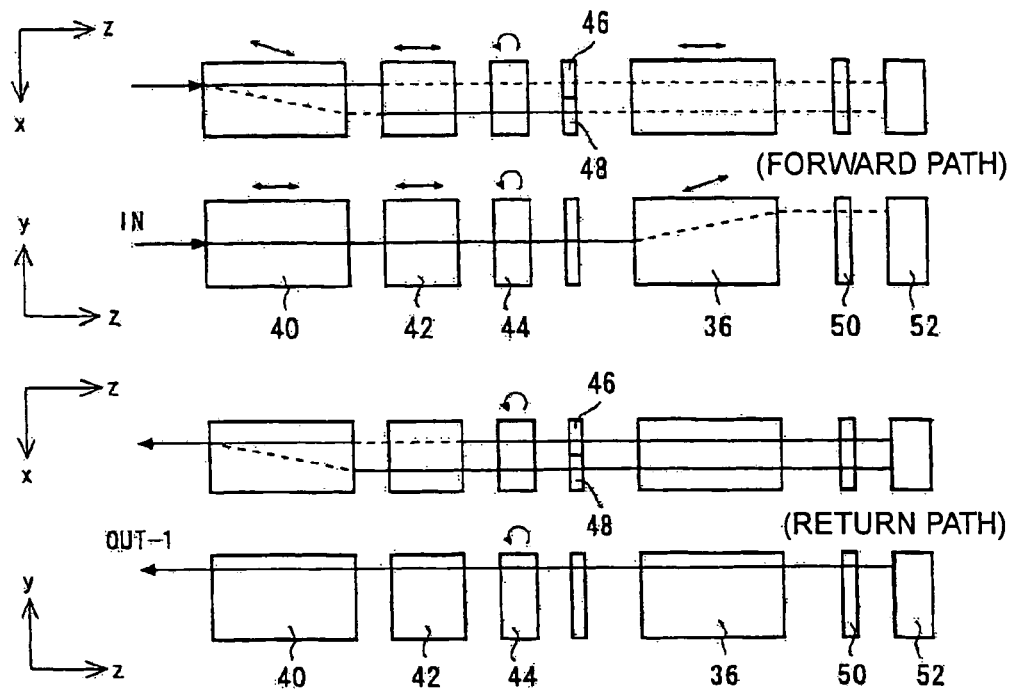
FIGS. 3A and 3B are explanatory views of forward and return paths of optical path under different switch conditions.
Figure 3B:
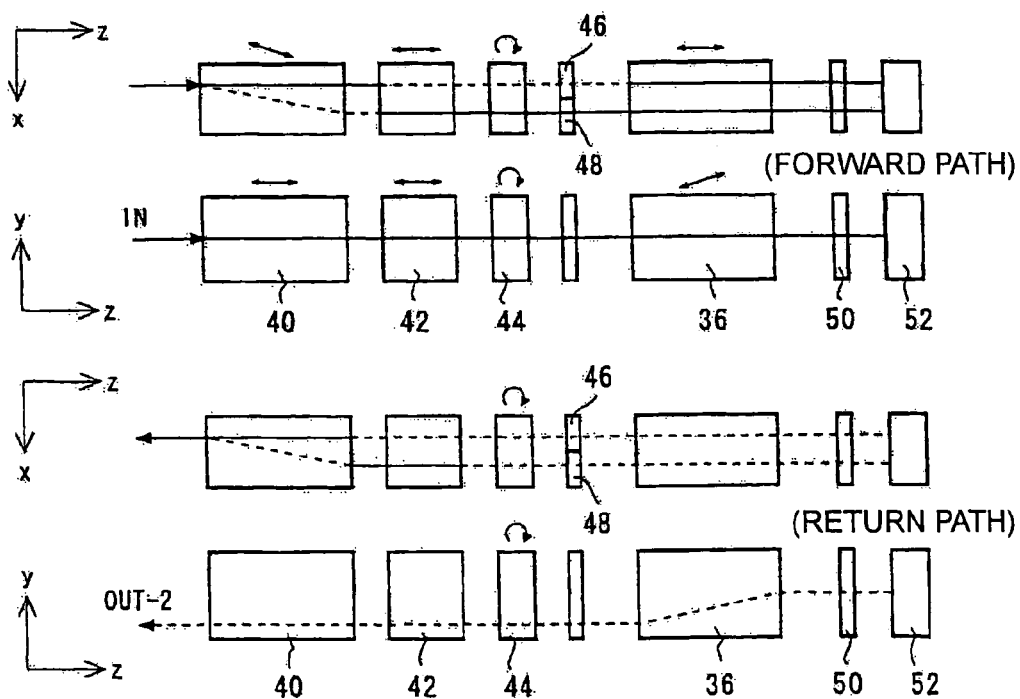

Details of the reflective optical switch functional unit 22 are shown in FIG. 2. This is an example of a 1×2 type (one input with two outputs). This figure shows arrangement of optical components and polarizing direction at each position, with arrows in each optical component representing the directions of optic axis and Faraday rotation. For simplicity of description, coordinate axes are set up as illustrated. Optical components are assumed to be arranged in the z direction (in the direction of depth in the figure), with two directions orthogonal thereto assumed to be the x direction (horizontal direction in the figure) and y direction (vertical direction in the figure). As for rotation direction, on the other hand, clockwise rotation is assumed to be positive looking in the z direction. FIGS. 3A and 3B show different optical paths as a result of switching operation by the reflective optical switch functional unit.

The reflective optical switch functional unit 22 is provided with a polarization separator/combiner 30 for separating lights in the same optical path whose polarizing directions are orthogonal to each other and combining lights in different optical paths, a Faraday rotation angle changer 32, a polarization rotator 34 for changing the relationship in polarizing direction between lights in different optical paths from orthogonal to parallel or from parallel to orthogonal, a birefringence element for optical path control 36 for controlling optical path shift in response to polarizing direction and a polarization rotating reflector 38 for rotating polarizing direction 90 degrees on forward and return paths, with these components arranged along the optical path.

The polarization separator/combiner 30 is here provided with a birefringence element for separation/combination 40 and a birefringence element for polarization dispersion compensation 42. The birefringence element for separation/combination 40 has an optic axis parallel with the xz plane and inclined relative to the z axis, separating, in the +x direction, lights in the same optical path whose polarizing directions are orthogonal to each other and combining, in the −x direction, lights opposite in direction in different optical paths. The birefringence element for polarization dispersion compensation 42 has an optic axis parallel with the y axis, and is designed, despite no change in optical path in the z direction, to change places of ordinary and extraordinary lights of the birefringence element for separation/combination 40, thus compensating for polarization dispersion. These elements are made, for example, of rutile.

The Faraday rotation angle changer 32 has a Faraday element 44 and the electromagnet 20 for controlling ±45-degree change in polarizing direction of transmitted light (see FIG. 1A). The Faraday element 44 is made, for example, of LPE film—a Bi-substituted rare-earth iron garnet crystal. The Faraday rotation angle changer 32 is constructed to change the direction of an external magnetic field applied to the Faraday element 44, i.e., the polarizing direction, to +45 or −45 degrees in response to the direction of energization to the electromagnet coil.

The polarization rotator 34 includes a pair of ½ wave plates 46 and 48 provided in the left and right optical paths, with the optic axes thereof set up so that they are symmetrical in the xy plane with respect to the y axis (left axis inclined +22.5 degrees and right axis inclined −22.5 degrees looking in the z direction).

The birefringence element for optical path control 36 has an optic axis parallel with the yz plane and inclined relative to the z axis, controlling optical path shift in the +y direction (−y direction for return light) in response to polarizing direction. This birefringence element may also be made, for example, of rutile.

The polarization rotating reflector 38 for rotating polarizing direction 90 degrees on forward and return paths is here provided with a ¼ wave plate 50 and a mirror 52. The ¼ wave plate 50 has an optic axis inclined 45 degrees relative to the z axis in the xy plane.

Then, there are set up on the side of the birefringence element for separation/combination of the reflective optical switch functional unit 22, an input port (IN) and output ports 1 (OUT-1) and 2 (OUT-2) (that is, input and output ports are provided on the same side), thus coupling light from the input port with a selected output port by a drive current switching operation of the Faraday rotation angle changer 32.

A description will be given of the operation of the reflective optical switch functional unit based on FIG. 2 and FIGS. 3A and 3B. The input port (IN) is set up on the middle stage, whereas output ports 1 (OUT-1) and 2 (OUT-2) are set up respectively on the upper and lower stages.

[Input Port (IN)→Output Port 1 (OUT-1)]

First, the Faraday rotation angle of the Faraday element 44 is rotated +45 degrees by the drive current switching operation of the Faraday rotation angle changer 32. Of light input in the +z direction from the input port on the middle stage on the left side, ordinary light travels straight through the birefringence element for separation/combination 40, whereas extraordinary light is refracted, resulting in light separation in the +x direction. Both lights pass through the birefringence element for polarization dispersion compensation 42 as is. At the Faraday rotation angle changer 32, the polarizing direction of each light rotates +45 degrees, and then at the polarization rotator 34, the relationship in polarizing direction between the two lights changes from orthogonal to parallel (parallel with the y axis). That is, the polarizing direction of light in the left optical path rotates +135 degrees as the light passes through the ½ wave plate 46, whereas the polarizing direction of light in the right optical path rotates −135 degrees as the light passes through ½ the wave plate 48. The reason for this is that the ½ wave plates have the property to change the polarization plane of input light to a direction symmetrical with respect to the optic axis. Since these lights are extraordinary lights for the birefringence element for optical path control 36, they refract in the +y direction, shifting to the optical path on the upper stage. The linear polarization turns into a circular polarization at the ¼ wave plate 50, reaching the mirror 52.

Although reflected light of the mirror 52 remains as circular polarization, the light changes back to a linear polarization as it passes again through the ¼ wave plate 50. However, the polarizing direction becomes parallel with the x axis. Since these lights are ordinary lights for the birefringence element for optical path control 36, the optical path does not shift, thus causing the lights to travel straight as is. At the polarization rotator 34, the relationship in polarizing direction between the two lights is changed from parallel to orthogonal (±45 degrees). That is, the polarizing direction of light in the left optical path rotates +45 degrees as the light passes through the ½ wave plate 46, whereas the polarizing direction of light in the right optical path rotates −45 degrees as the light passes through the ½ wave plate 48. At the Faraday rotation angle changer 32, the polarizing direction of each light rotates +45 degrees. Both lights pass through the birefringence element for polarization dispersion compensation 42 as is, and ordinary light travels straight through the birefringence element for separation/combination 40, whereas extraordinary light is refracted, resulting in light combination in the −x direction and coupling with output port 1 on the upper stage on the left side.

[Input Port (IN)→Output Port 2 (OUT-2)]

Next, the Faraday rotation angle of the Faraday element 44 is rotated −45 degrees by the drive current switching operation of the Faraday rotation angle changer 32. Of light input in the +z direction from the input port on the middle stage on the left side, ordinary light travels straight through the birefringence element for separation/combination 40, whereas extraordinary light is refracted, resulting in light separation in the +x direction. Both lights pass through the birefringence element for polarization dispersion compensation 42 as is. At the Faraday rotation angle changer 32, the polarizing direction of each light rotates −45 degrees, and then at the polarization rotator 34, the relationship in polarizing direction between the two lights changes from orthogonal to parallel (parallel with the x axis). That is, the polarizing direction of light in the left optical path rotates −45 degrees as the light passes through the ½ wave plate 46, whereas the polarizing direction of light in the right optical path rotates +45 degrees as the light passes through the ½ wave plate 48. Since these lights are ordinary lights for the birefringence element for optical path control 36, the optical path does not shift, thus causing the lights to travel straight as is. The linear polarization turns into a circular polarization at the ¼ wave plate 50, reaching the mirror 52.

Although reflected light of the mirror 52 remains as circular polarization, the light changes back to a linear polarization as it passes again through the ¼ wave plate 50. However, the polarizing direction becomes parallel with the y axis. Since these lights are extraordinary lights for the birefringence element for optical path control 36, they refract in the −y direction, shifting to the optical path on the lower stage. At the polarization rotator 34, the relationship in polarizing direction between the two lights is changed from parallel to orthogonal (±45 degrees). That is, the polarizing direction of light in the left optical path rotates +135 degrees as the light passes through the ¼ wave plate 46, whereas the polarizing direction of light in the right optical path rotates −135 degrees as the light passes through the ½ wave plate 48. Then at the Faraday rotation angle changer 32, the polarizing direction of each light rotates −45 degrees. Both lights pass through the birefringence element for polarization dispersion compensation 42 as is, and ordinary light travels straight through the birefringence element for separation/combination 40, whereas extraordinary light is refracted, resulting in light combination in the −x direction and coupling with output port 2 on the lower stage on the left side.

Thus, input light from the input port on the middle stage can be coupled with either output port 1 on the upper stage or output port 2 on the lower stage in response to control of the direction of energization current to the electromagnet coil of the Faraday rotation angle changer 32, thus allowing the switch to function as a 1×2 type optical switch.

Figure 4:
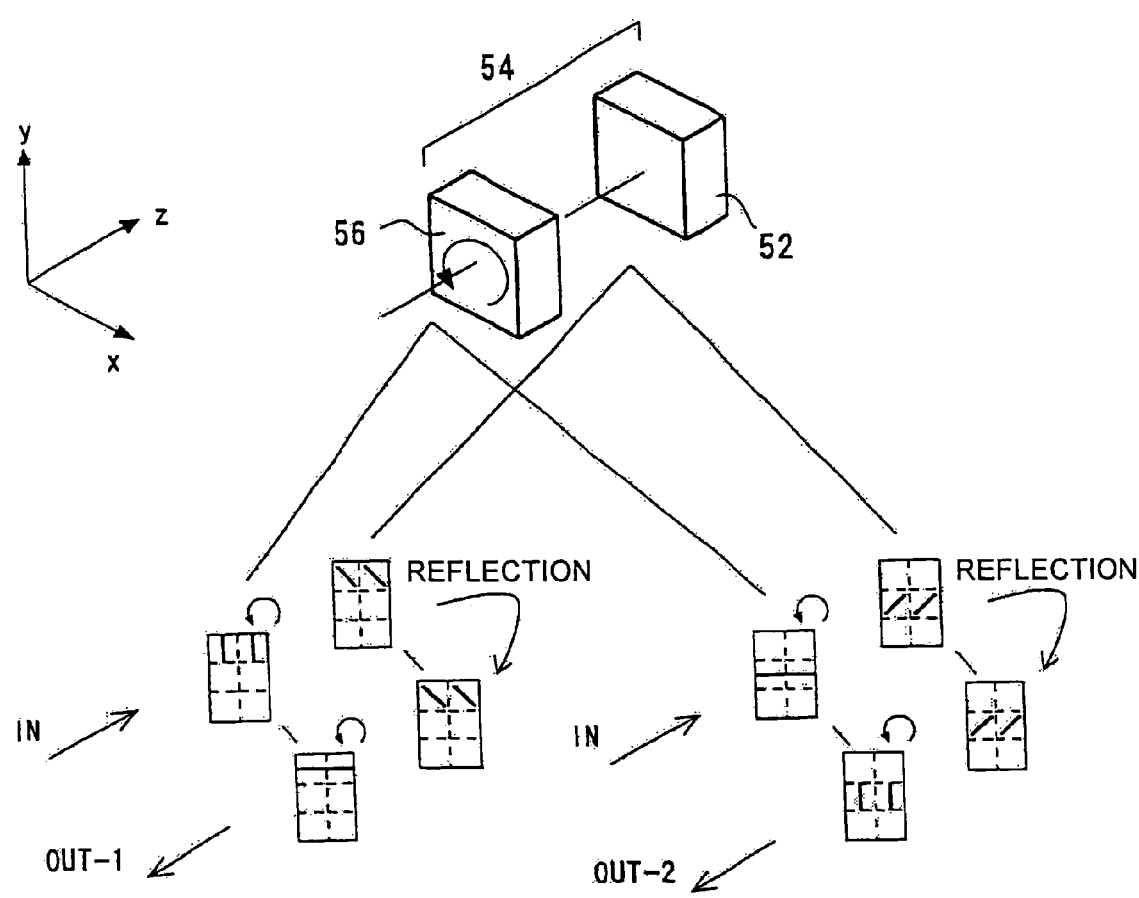
FIG. 4 is an explanatory view showing another example of a polarization rotating reflector.

FIG. 4, an explanatory view showing another example of a polarization rotating reflector used in the reflective optical switch functional unit, shows arrangement of optical components and polarizing direction at each position. Other configurations excluding the polarization rotating reflector may be the same as that in FIG. 2, and so their description will be omitted. Here, a polarization rotating reflector 54 for rotating the polarization plane 90 degrees on forward and return paths is provided with a fixed 45-degree Faraday rotator 56 and the mirror 52. The fixed 45-degree Faraday rotator 56 is provided with a Faraday element and a permanent magnet applying a unidirectional external fixed magnetic field thereto.

The polarizing directions of both lights from the birefringence element for optical path control toward the +z direction are each rotated 45 degrees by the fixed 45-degree Faraday rotator 56, and after reflection by the mirror 52, the polarizing directions are further rotated 45 degrees as the lights pass again through the fixed 45-degree Faraday rotator 56, and then the lights return to the birefringence element for optical path control. Since the Faraday rotator is a non-reciprocal component, the polarization direction rotates +45 degrees on forward path and +45 degrees on return path or +90 degrees in total. Therefore, since optical paths and their changes between the birefringence element for optical path control and the polarization rotating reflector 54 are the same as those shown in FIG. 2, the polarization rotating reflector 54 in this configuration can be replaced as is with the polarization rotating reflector 38 in FIG. 2.

Figure 5A:
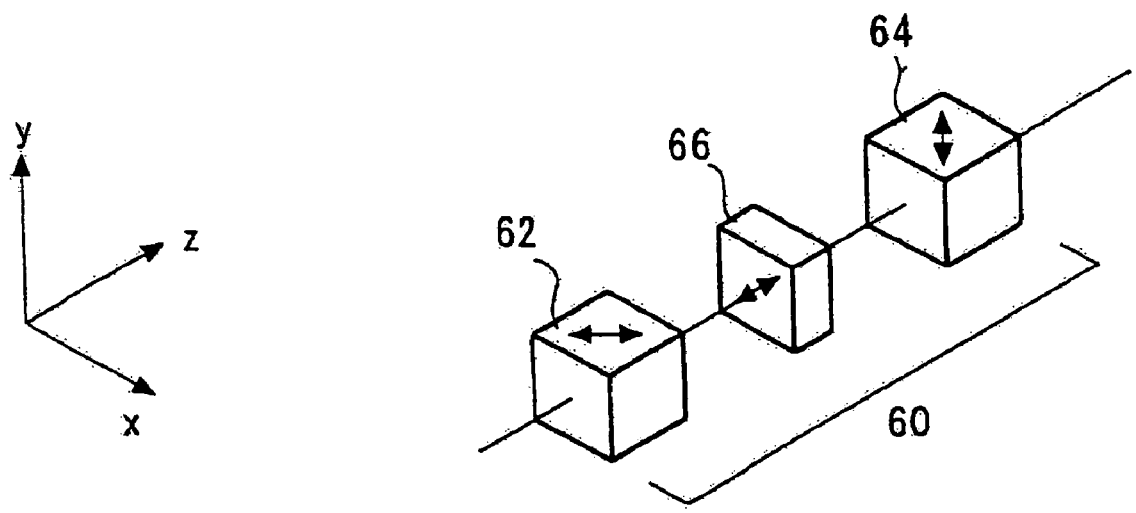
FIGS. 5A and 5B are explanatory views showing another example of a polarization separator/combiner.
Figure 5B:
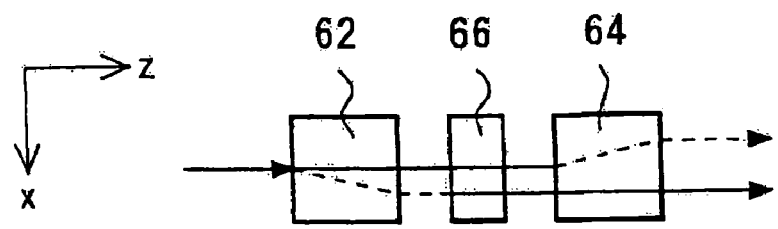

FIGS. 5A and 5B are explanatory views showing another example of a polarization separator/combiner. Here, a polarization separator/combiner 60 is provided with first and second birefringence elements for separation/combination 62 and 64 and a ½ wave plate 66 inserted therebetween. The first birefringence element for separation/combination 62 has an optic axis inclined from the z axis in the xy plane, whereas the second birefringence element for separation/combination 64 has an optic axis inclined oppositely to the first birefringence element from the z axis in the xy plane. That is, the optic axes of the first and second birefringence elements for separation/combination 62 and 64 are set up symmetrically with respect to the ½ wave plate 66 provided at the center. The optic axis of the ½ wave plate 66 is inclined 45 degrees from the x axis in the xy plane.

On forward path, ordinary light travels straight through the first birefringence element for separation/combination 62, whereas extraordinary light is refracted, resulting in light separation in the +x direction. The polarizing directions of both lights are each rotated 90 degrees by the ½ wave plate 66, causing ordinary and extraordinary lights to change places. Ordinary light travels straight through the second birefringence element for separation/combination 64, whereas extraordinary light is refracted, resulting in light separation in the −x direction. As a result, further light separation takes place. Assuming that the lengths of the first and second birefringence elements for separation/combination 62 and 64 are respectively half the length of the birefringence element for separation/combination 40 in FIG. 2, since the separation distances match in the xx direction, it is possible to make a substitution of the polarization separator/combiner 30 in FIG. 2 as is. In this configuration, ordinary and extraordinary lights change places at the first and second birefringence elements for separation/combination 62 and 64, thus allowing compensation of polarization dispersion.

Figure 6A:
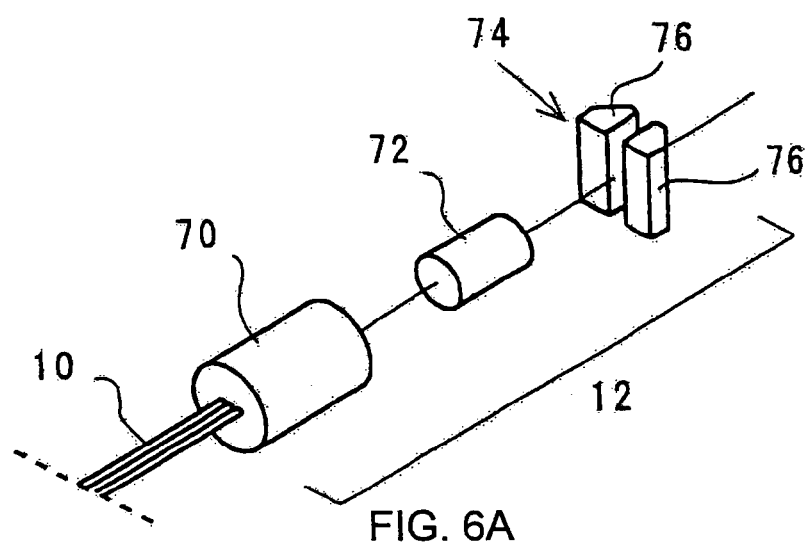
FIGS. 6A and 6B are explanatory views showing an example of an input/output port portion.
Figure 6B:
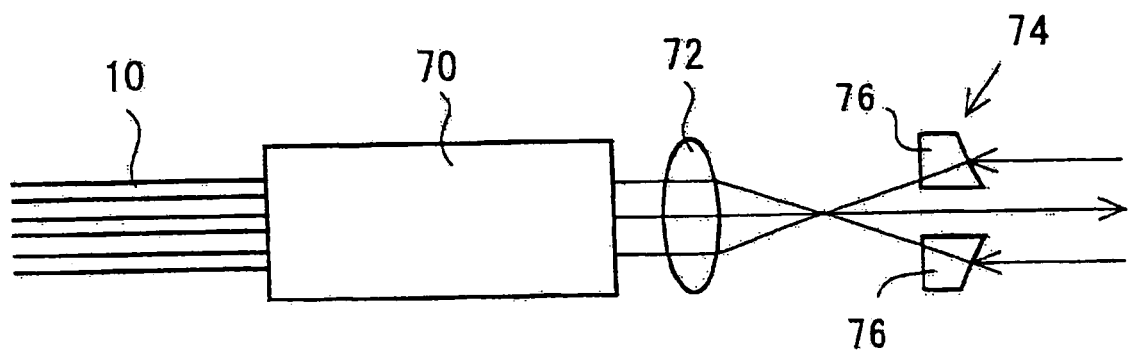

A specific configuration example of an input/output port portion is shown in FIGS. 6A and 6B. The input/output port portion 12 is provided with an arrangement of a three—fiber ferrule 70 accommodating the three fibers 10 in parallel in a single ferrule, a single fiber coupling lens 72 common to the three fibers 10 and an optical path correcting element 74. The fiber at the center is for input, whereas the fibers on both sides are for output.

The optical path correcting element 74 serves the function of causing a beam among light on its return path—a beam that is offset (separated from the optical axis) and parallel with the optical axis—to fall diagonally on the lens 72, thus coupling the beam with the outer fiber. The optical path correcting element 74 also has the function to turn light—light heading from the central fiber toward the center of the lens 72—into a parallel beam along the optical axis as is without any angle change.

Here, the optical path correcting element 74 is a combination of two wedge-shaped prisms 76 arranged symmetrically with a gap in the center. Right-angled triangular prisms may be used in place of the wedge-shaped prisms 76. Light on forward path from the central fiber passes through the center of the lens 72, passing as is through the gap between the two wedge-shaped prisms 76. Light on return path on the outside, offset light, is refracted by the oblique surfaces of the wedge-shaped prisms 76 as it passes through these prisms, thus turning into a parallel beam along the optical axis and being coupled with the outer fiber.

Although the component count is high, this configuration of the optical path correcting element does not translate into a significant cost increase because it is only necessary to combine prisms of the same shape. On the other hand, the central beam does not enter the prisms, offering the advantage that the beam remains free, for example, from characteristic deterioration due to reflection on the prism surface.

If the configuration as shown in FIGS. 1A and 1B is implemented by combining the input/output port portion 12, provided with a combination of the three-fiber ferrule 70, the single common lens 72 and the optical path correcting element 74, with the reflective optical switch functional unit 22, it is possible to adjust all the input and output ports at the same time. Additionally, each optical component needs only to have an effective diameter and thickness, about 6 times the beam diameter and appropriate to the distance, thus allowing considerable reduction in size (diameter).

For example, if rutile is used as birefringence elements and if their optic axes are inclined 45 degrees from the optical axis, it is possible to obtain an amount of optical path shift about 1/10 the thickness of the birefringence elements (length along the optical axis). This amount of optical path shift needs only to be about six times the beam waist diameter, which means that assuming a beam waist diameter of 50 μm, the birefringence elements need only to be roughly 3 mm in thickness and 1.5 mm square in effective diameter. Further, the present invention, being reflective, takes advantage of round trip of light, thus shortening the optical switch functional unit. From the above, it is possible to achieve a significant downsizing (reduction in length and diameter) as compared with the related arts.

Figure 7:
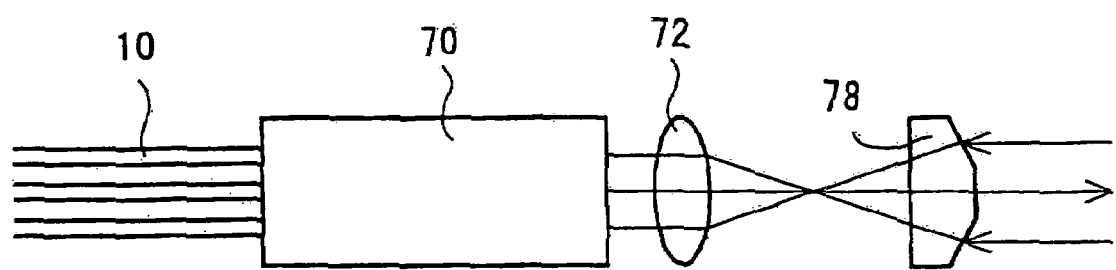
FIG. 7 is an explanatory view showing another example of the input/output port portion.

While in the above embodiments, a combination of two prisms is used as the optical path correcting element, a prism 78 of integral structure may be used as shown in FIG. 7. This optical path correcting element is a prism shaped as if two ridgeline portions of a rectangular parallelepiped (square flat plate body), parallel with and adjacent to each other, were diagonally cut off and used as oblique surfaces. This prism may be trapezoidal in cross section. If formed in an integral structure, the prism will have a smaller number of components, thus facilitating assembly work.

Figure 8:
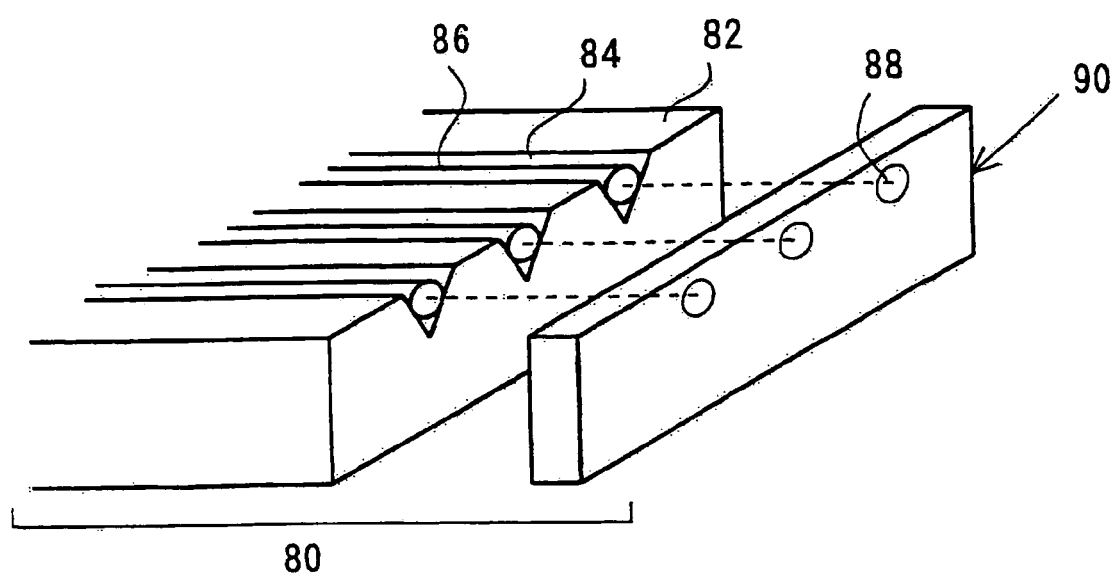
FIG. 8 is an explanatory view showing still another example of the input/output port portion.

FIG. 8 shows another specific example of configuration of the input/output port portion. Here, the input/output port portion 80 is provided with a collimator array having a structure in which three V grooves 84 are formed on a glass substrate 82, with each of the V grooves 84 accommodating and arranging a fiber core portion 86, and with a lens array 90 having micro lenses 88 positioned at the tips of the fiber core portions.

While in the above embodiments, a case was described in which the input/output port portion with three fibers was used, an optical switch array may be configured by using the input/output port portion with four or more fibers installed together. In such a case, the collimator array structure shown in FIG. 8 is preferred.

According to the embodiments of the present invention set forth hereinabove, a reflective configuration is adopted in which an input/output port portion having a plurality of fibers is provided at one end of an optical switch functional unit so that light couples with a different fiber after a round trip through the optical switch functional unit. This makes it possible to reduce component count and shorten the length, thus allowing downsizing and higher performance.

On the other hand, it is possible to considerably narrow the beam-to-beam gap by providing multiple ports through use of a multi-fiber ferrule, combining a common lens with the ferrule and properly adjusting the optical path with an optical path correcting element. This makes it possible for optical components used to have a small thickness (length along the optical axis) and a small cross section vertical to the optical axis, thus allowing considerable downsizing (reduction in length and diameter). On the other hand, it is possible by using a collimator array to assemble multiple ports at the same time, thus allowing reduction in man-hours required for assembly.

The invention claimed is:

1. A reflective optical switch comprising:
    an input/output port portion having a plurality of fibers;
    a polarization separator/combiner for separating lights in the same optical path whose polarizing directions are orthogonal to each other and combining lights in different optical paths, the polarization separator/combiner including a birefringence element for separation/combination and a birefringence element for polarization dispersion compensation so that polarization dispersion is compensated for by setting the optic axis of the birefringence element for polarization dispersion compensation relative to the optic axis of the birefringence element for separation/combination so as to reverse the correspondence of two incident lights having orthogonal polarizing directions to ordinary and extraordinary lights between the two birefringence elements;
    a Faraday rotation angle changer;
    a polarization rotator for changing the relationship in polarizing direction between lights in different optical paths from orthogonal to parallel or from parallel to orthogonal;
    a birefringence element for optical path control for controlling optical path shift in response to polarizing direction; and
    a polarization rotating reflector for rotating polarizing direction 90 degrees on forward and return paths, wherein
    the input/output port portion, the polarization separator/combiner, the Faraday rotation angle changer, the polarization rotator, the birefringence element for optical path control, and the polarization rotating reflector are arranged along the optical path in that order, and wherein
    the Faraday rotation angle changer includes a Faraday element and an electromagnet for controlling 90-degree change in polarizing direction of transmitted light thereof.

2. A reflective optical switch according to claim 1, wherein the polarization rotating reflector is provided with a ¼ wave plate and a mirror.

3. A reflective optical switch according to claim 1, wherein the polarization rotating reflector includes a fixed 45-degree Faraday rotator and a mirror.

4. A reflective optical switch according to claim 1, wherein the input/output port portion includes a multi-fiber ferrule having three or more fibers, a fiber coupling lens common to the fibers, and an optical path correcting element for turning light emitted from the fiber into a beam parallel with the optical axis and coupling the beam parallel with the optical axis, that is a return beam, with the fiber.

5. A reflective optical switch according to claim 4, wherein a three-fiber ferrule is used as the multi-fiber ferrule, and wherein the optical path correcting element includes a combination of two right-angled triangular or wedge-shaped prisms that are arranged symmetrically with a gap so as not to block the central optical path.

6. A reflective optical switch according to claim 4, wherein a three-fiber ferrule is used as the multi-fiber ferrule, and wherein the optical path correcting element includes a prism obtained by diagonally cutting off two ridgeline portions of a rectangular parallelepiped, parallel with and adjacent to each other, or a trapezoidal prism.

7. A reflective optical switch according to claim 1, wherein the input/output port portion includes a collimator array having a structure in which three or more grooves are formed on a substrate, with the grooves accommodating and arranging fiber core portions, and with a lens array having micro lenses positioned at the tips thereof.

8. A reflective optical switch comprising:
an input/output port portion having a plurality of fibers;
a polarization separator/combiner for separating lights in the same optical path whose polarizing directions are orthogonal to each other and combining lights in different optical paths, the polarization separator/combiner including first and second birefringence elements for separation/combination and a ½ wave plate interposed therebetween so that polarization dispersion is compensated for by the ½ wave plate reversing the correspondence of two incident lights having orthogonal polarizing directions to ordinary and extraordinary lights between the two birefringence elements;
a Faraday rotation angle changer;
a polarization rotator for changing the relationship in polarizing direction between lights in different optical paths from orthogonal to parallel or from parallel to orthogonal;
a birefringence element for optical path control for controlling optical path shift in response to polarizing direction; and
a polarization rotating reflector for rotating polarizing direction 90 degrees on forward and return paths,
wherein
the input/output port portion, the polarization separator/combiner, the Faraday rotation angle changer, the polarization rotator, the birefringence element for optical path control, and the polarization rotating reflector are arranged along the optical path in that order, and wherein
the Faraday rotation angle changer includes a Faraday element and an electromagnet for controlling 90-degree change in polarizing direction of transmitted light thereof.

9. A reflective optical switch according to claim 8, wherein the polarization rotating reflector is provided with a ¼ wave plate and a mirror.

10. A reflective optical switch according to claim 8, wherein the polarization rotating reflector includes a fixed 45-degree Faraday rotator and a mirror.

11. A reflective optical switch according to claim 8, wherein the input/output port portion includes a multi-fiber ferrule having three or more fibers, a fiber coupling lens common to the fibers, and an optical path correcting element for turning light emitted from the fiber into a beam parallel with the optical axis and coupling the beam parallel with the optical axis, that is a return beam, with the fiber.

12. A reflective optical switch according to claim 11, wherein a three-fiber ferrule is used as the multi-fiber ferrule, and wherein the optical path correcting element includes a combination of two right-angled triangular or wedge-shaped prisms that are arranged symmetrically with a gap so as not to block the central optical path.

13. A reflective optical switch according to claim 11, wherein a three-fiber ferrule is used as the multi-fiber ferrule, and wherein the optical path correcting element includes a prism obtained by diagonally cutting off two ridgeline portions of a rectangular parallelepiped, parallel with and adjacent to each other, or a trapezoidal prism.

14. A reflective optical switch according to claim 8, wherein the input/output port portion includes a collimator array having a structure in which three or more grooves are formed on a substrate, with the grooves accommodating and arranging fiber core portions, and with a lens array having micro lenses positioned at the tips thereof.

* * * * *